(12) United States Patent
Hogan

(10) Patent No.: US 7,445,087 B2
(45) Date of Patent: Nov. 4, 2008

(54) SEAL-LESS HEAD APPARATUS

(75) Inventor: Richard L. Hogan, Helena, MT (US)

(73) Assignee: MT Hydraulics, LLC, Helena, MT (US)

( * ) Notice: Subject to any disclaimer, the term of this patent is extended or adjusted under 35 U.S.C. 154(b) by 570 days.

(21) Appl. No.: 11/304,635

(22) Filed: Dec. 16, 2005

(65) Prior Publication Data

US 2006/0131108 A1 Jun. 22, 2006

Related U.S. Application Data

(60) Provisional application No. 60/637,126, filed on Dec. 17, 2004.

(51) Int. Cl.
*B23Q 11/12* (2006.01)
*F16C 32/06* (2006.01)

(52) U.S. Cl. ............. 184/6.14; 409/135; 409/136; 409/231; 384/107; 277/400

(58) Field of Classification Search ............. 184/6.14; 409/135, 136, 231; 384/107; 277/400
See application file for complete search history.

(56) References Cited

U.S. PATENT DOCUMENTS

| | | | | | |
|---|---|---|---|---|---|
| 2,402,170 | A | * | 6/1946 | Lund | ............. 241/66 |
| 2,577,303 | A | * | 12/1951 | Bohlander | ............. 72/69 |
| 2,621,860 | A | * | 12/1952 | Gruender | ............. 241/202 |
| 3,499,653 | A | * | 3/1970 | Gardner | ............. 277/362 |
| 3,527,465 | A | * | 9/1970 | Guinard | ............. 277/400 |
| 4,892,418 | A | | 1/1990 | Asada et al. | |
| 5,112,142 | A | | 5/1992 | Titcomb et al. | |
| 5,246,294 | A | | 9/1993 | Pan | |
| 5,876,124 | A | | 3/1999 | Zang et al. | |
| 6,378,209 | B1 | * | 4/2002 | Gomyo et al. | ............. 29/898.02 |

* cited by examiner

*Primary Examiner*—Robert A Siconolfi
*Assistant Examiner*—Mahbubur Rashid
(74) *Attorney, Agent, or Firm*—Gough, Shanahan, Johnson and Waterman, PLLP

(57) ABSTRACT

A mill head assembly apparatus utilizing centrifugal hydrodynamic force to circulate lubrication oil while retaining the lubricant without the need for a replaceable (contact-type) seal, the apparatus comprising a set of stationary components including a trunnion, an oil ring, a bearing-retainer, and a collector ring and rotating components including a housing, a pump ring, and a baffle-ring, front and rear bearing means. The oil ring receives and circulates the lubrication oil to the bearing means, the housing is disposed with a plurality of housing passages to re-circulate the lubrication oil, and the forward and rear rotating interfaces to retain the lubrication oil within the front and rear mill head assembly. Potential lubrication oil leakage is retained and re-circulated back to the collector ring by close-tolerance seal means.

12 Claims, 2 Drawing Sheets

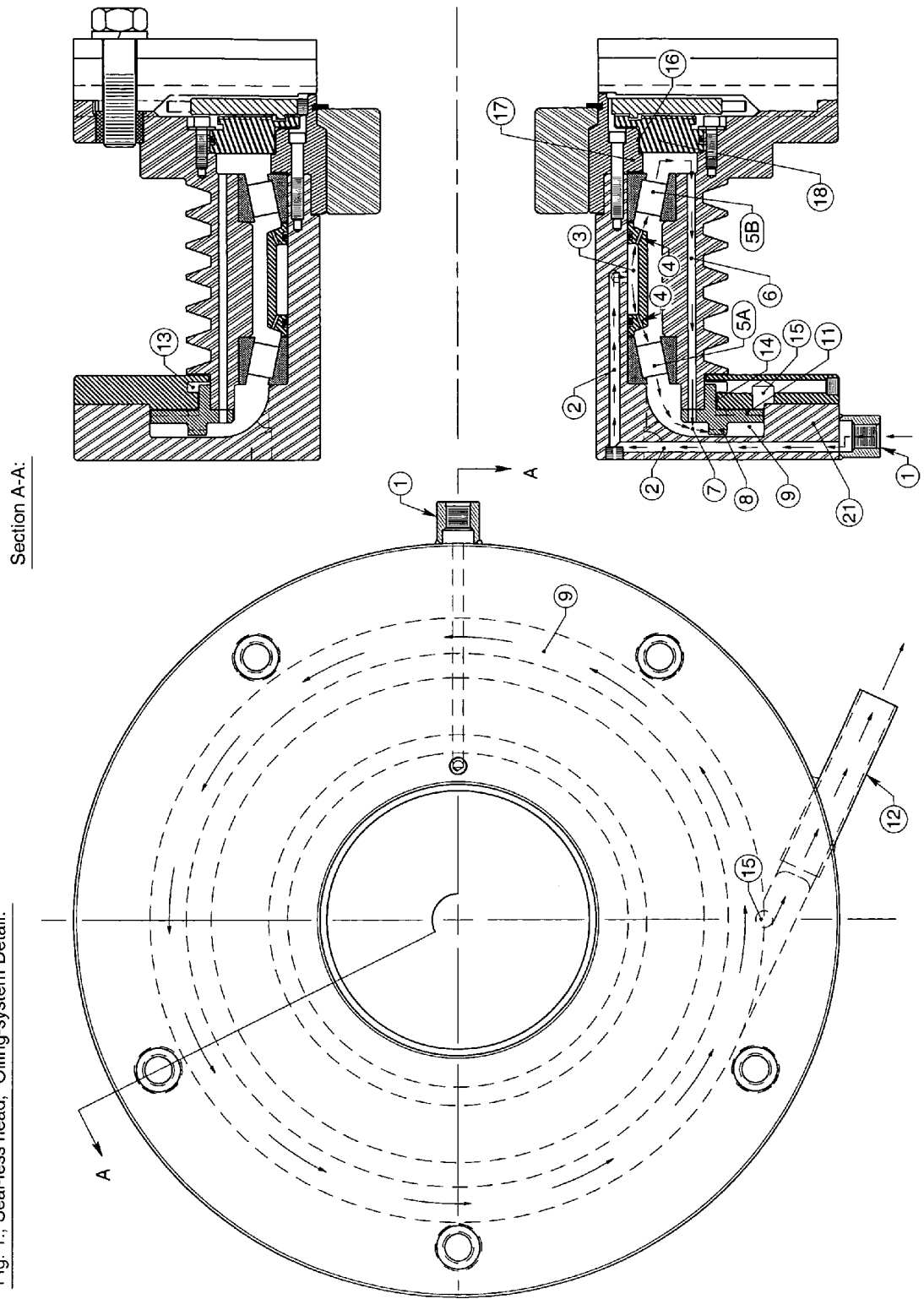

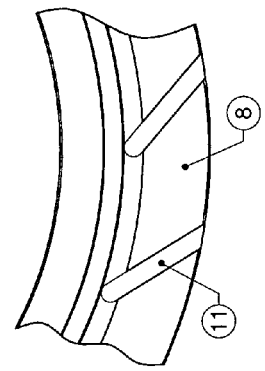
Section A-A; (Pump-ring (8), only):
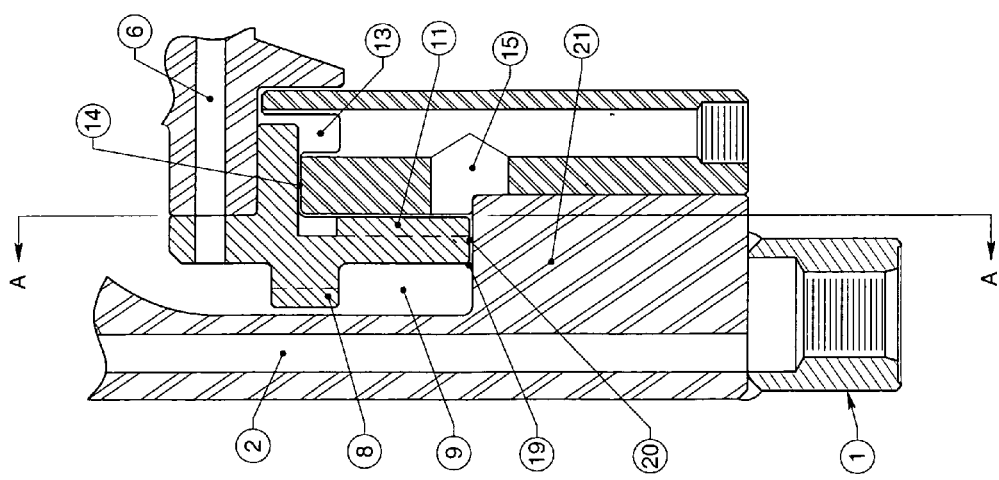
Fig. 2., Seal-less head; Rear rotating-interface Detail:

SEAL-LESS HEAD APPARATUS

CROSS REFERENCE To RELATED APPLICATIONS

This application claims the benefit of a Provisional Patent Application, Application No. 60/637,126, filing date of Dec. 17, 2004.

BACKGROUND OF THE INVENTION

Historically, dowel-mill head assembly-assemblies have relied on two means of lubrication; either A) Bearing-grease, usually providing lubrication for ball-bearings; or B) Lubricating-oil which is applied and distributed through the assembly, usually for lubrication of roller-bearings. Each of these types of bearing-lubrication has associated with it its own unique set of drawbacks.

For example, the use of grease as a lubricant usually leads to: A) higher operating temperatures, (since no mechanism exists for heat-dissipation from the head, except for convection-cooling with the ambient-air), and B) lower operating assembly rotation speed. Lower operating-assembly rotational-speeds not only restrict product output-levels but also functions to severely-limit the quality of the finished milled-product. Higher operating temperature-levels will naturally lead to increased stress on assembly-parts and which in turn leads to increased maintenance-requirements.

In comparison to grease, use of lubricating-oil as a bearing-lubricant in a dowel-mill head assembly provides reduced operating temperature-levels, due to the improved-ability of the lubricating oil-stream (stream of lubrication oil) to carry heat away from the head, (as compared to the air-cooling mode of heat-transfer associated with a grease-lubricated system). As a consequence, operating-assembly rotational-speeds can be increased greatly, with several beneficial-results, including; A) greater product output, B) better surface-finish quality on the finished wood-dowels, and C) reduced equipment maintenance-requirements. A lubricating-oil system, however, places more stringent performance requirements on the sealing-system in the dowel-mill head assembly, due to; A) the much-lower viscosity of the lubrication oil compared to grease, and B) the greatly-increased rotational-speeds allowed by such a system.

The sealing-system commonly found in earlier dowel-mill head assembly-assemblies which utilize lubricating-oil as a bearing-lubricant, typically achieve lubrication oil-retention within the head through the use of various-types of "contacting" oil-seals. A "contacting"-seal (contact-type) is defined as type of seal which forms a barrier to lubricant-loss at each rotating-interface through use of a flexible-type lip, which is positioned to make light-contact with a particular rotating part of the head, thus forming the required lubricant-seal. The seal-lip typically utilizes a flexible, heat & petroleum-resistant material such as Neoprene. Although this type of seal can be effective in its role, there are multiple functional-limitations associated with this type of seal including: A) Wear of the seal-lip, and B) Heat-generation occurring as a result of rubbing-friction between the lip and the rotating seal-surface. As a result, "contacting"-seals are considered to be consumable-entities, requiring periodic-replacement, typically after every 500-600 hours of operation. Seal-replacement, in the case of a dowel-mill head assembly, requires that each time the head be removed from the machine, disassembled, cleaned, and rebuilt, using new seals. This procedure can lead to large yearly maintenance-costs, (in both labor & materials), in addition to many hours each year where the unit is out of service, (downtime).

This invention discloses a specific mill head assembly, utilizing centrifugal hydrodynamic force and other properties of fluid dynamics, which directs lubricant flow and retains lubricant without the need for a replaceable (contact-type) seal.

BRIEF SUMMARY OF THE INVENTION

The preferred embodiment of the disclosed invention comprises a plurality of components. Such components are individually configured and correlated with respect to each other to allow a rotating head to retain and re-circulate lubrication and or cooling lubrication oil within the head without the use of separate replaceable seals.

In its broadest terms, such seal-less head apparatus consists of:
1. Bearings suitable to withstand the appropriate load and velocities;
2. An lubrication oil supply capable of lubricating and cooling said bearings; and
3. A system to retain, collect, and re-circulate said lubrication oil within the head.

The seal-less head apparatus uses centrifugal hydrodynamic force as a primary means of return lubrication oil control and does not require the use of conventional oil seals thereby lowering maintenance costs.

Related art has provided information regarding approaches for circulating lubrication fluid in a hydrodynamic manner, but none provide for lubrication retention and re-circulation in a mill head assembly, nor for use in a related context with a seal-less head apparatus. An example of a centrifugal hydrodynamic force to assist bearing seals is disclosed in U.S. Pat. No. 5,423,612 to Zang et al., whereby capillary forces retain lubricant within a bearing unit/system to prevent lubricant from leaking, in relation to spindle bearings for computer disc drives, in order to reduce acoustic noise and provide resistance to shock and vibration. U.S. Pat. No. 5,246,294 to Pan, U.S. Pat. No. 5,112,142 to Titcomb et al., and U.S. Pat. No. 4,892,418 to Asada et al. provide related information for circulating lubrication fluid in spindle bearings for computer disc drives. However, these patents do not provide for the re-circulation and retention of lubrication oil between a set of stationary components and a set of rotating components throughout an entire mill head assembly, in a seal-less manner as found in the apparatus and method of the present invention.

These and other objects, advantages, aspects, and features of the present invention will be more fully understood and appreciated by those skilled in the art upon consideration of the following detailed description of a preferred embodiment, presented in conjunction with the accompanying drawings.

BRIEF DESCRIPTION OF THE SEVERAL VIEWS OF THE DRAWINGS

FIG. 1; Seal-less head apparatus; Oiling-system Detail; Presents two (2)—views depicting a seal-less head apparatus. Illustrated is the routing of the lubrication oiling-system within the head as well as various head-components having functions relevant to lubrication oiling-system operation.

Rear-view; a view normal to the mounting-face (rear-surface) of the head.

Section AA; a diametral cross-section of the head, the location & orientation of which is depicted in the Rear-view.

FIG. 2; Seal-less head apparatus; Rear rotating-interface Detail; Presents two (2)—views depicting detail-views of the Rear rotating-interface. Illustrated are head-components relevant to lubrication oiling-system operation which constitute the Rear rotating-interface.

Longitudinal cross-section through the Rear rotating-interface.

Section A-A; a transverse cross-section through the Rear rotating interface, the location & orientation of which is depicted in the Longitudinal cross-section.

DETAILED DESCRIPTION OF THE INVENTION

Specifically, and referring to FIG. 1 and FIG. 2, a typical embodiment of the disclosed invention operates as follows:

A. Lubricating oil is supplied under pressure by an external lubricating means, such as a lubricating-pump to the Supply port (1), from the open end and through the supply port end, where the lubrication oil then enters the head. After passing through the Supply port (1), the lubrication oil flows through the Supply passage (2), via the supply port end and the oil ring end, respectively, to the inner annulus of the Oil ring (3).

B. Lubricating oil is then forced under pressure, generated by the lubricating-pump, through a plurality of spray holes (4) in both ends (ring front end and ring back end, respectively) of the Oil ring.

C. These individual jets of lubrication oil pass through the front bearing means (5B), and the rear bearing means (5A), thus cooling & lubricating the bearings.

D. The bearings must be suitable to withstand the appropriate load and velocities and may include a plurality of ball bearings or a plurality of tapered roller bearings.

E. Oil jets passing through the front bearing means (5B) combine into one lubrication oil stream and flow toward the rear of the head through a plurality of housing passages (6) drilled into the Housing (This lubrication oil constitutes ½ of head oil flow).

F. Physical phenomena exerting control on the lubrication oil stream exiting the front bearing means (5B) include the following:

a. Centrifugal hydrodynamic force. Centrifugal hydrodynamic force is primarily responsible for the direction of the lubrication oil stream into the plurality of housing passages (6) which provide a passage toward the rear of the head. As the lubrication oil-stream exits the forward-bearing it is acted upon by a centrifugal hydrodynamic force generated by the rotational-motion of the head. The resultant-effect of this force is to cause the lubrication oil-stream to be directed radially-outward, toward the entrance of the plurality of housing passages (6). It is at the entrance of the plurality of housing passages (6) that this radial-movement of the lubrication oil-stream is caused to cease, by virtue of the internal-configuration of the lubrication oil-passages in the vicinity of the entrance of the plurality of housing passages (6). As a result of this re-direction of the lubrication oil-stream, the static-pressure present within the lubrication oil-stream is then caused to increase. It is this increased static-pressure level within the lubrication oil-stream which then induces the lubrication oil-stream to flow through the plurality of housing passages (6), in a direction toward the rear of the head.

b. Labyrinth-type sealing means of the lubrication oil stream. A series of close tolerance labyrinth-type seal means provides retention of the lubrication oil stream at the Forward rotating interface. (16). Containment of the lubrication oil-stream exiting the forward-bearing (the lubrication oil-stream is hypothesized to be a spray or mist at this point in the flow-path) is provided by the forward labyrinth-type sealing means. A convoluted, multi-directional labyrinth-passage is present by virtue of the mounting-relationship of the head-components, specifically; the Bearing-retainer (17) and Forward-baffle (18) at the Forward Rotating-interface (16).

G. The Pump ring (8), performs 3 specific tasks relevant to containing the lubricating oil-stream within dowel-mill head assembly.

a. The forward surface of the Pump ring (8) generates a centrifugal pumping action, which functions to create an adverse pressure-gradient to a potential leakage-flow exiting the Collector-ring annulus (9) through the Rear Rotating-interface. (Physical-mechanism described in Part N.)

b. The rear-surface of the Pump ring (8) imparts angular-momentum to the lubrication oil-stream. (Physical-mechanism described in Part K.)

c. The outer-perimeter of the front-surface of the Pump-ring (8) functions to draw leakage flow from the Drain groove (13), into the Collector ring annulus (9), through Drain passage (15). (Physical-mechanism described in Part P.)

J. As with the front bearing means described in F. above, Oil jets passing through the rear bearing means (5A) also combine into one lubrication oil stream (the remaining ½ of total head lubrication oil flow) that flows toward (7) where it combines with the lubrication oil stream flowing through the plurality of housing passages (6).

K. The resulting stream (total head flow) passes through a plurality of pump ring slots, located in the rearward-facing surface of the Pump ring (8), which serves to impart angular-momentum to the lubrication oil stream. This angular-momentum (i. e. rotational-momentum or "momentum in a circular-path") of the lubrication oil-stream, is more specifically-defined as the momentum of the lubrication oil-stream in a direction which is tangential to the outer-circumference of the Pump-ring (8). The addition of angular-momentum to the exiting lubrication oil-stream, in turn, serves to increase the level of centrifugal hydrodynamic force acting on the lubrication oil-stream and causing it to be directed to the outer circumference of the collector ring annulus (9). Thus control of the exit lubrication oil-stream is enhanced through the addition of angular-momentum to the lubrication oil-stream by the Pump ring (8).

L. This stream then leaves the Collector ring annulus (9), exiting the Return port (12) at the collector ring end and out the free port end.

M. The lubrication oil stream is retained within the Collector ring annulus (9), prior to exiting the head, by the series-combination of a close-tolerance labyrinth-type sealing means (14 & 20), including a plurality of pumping grooves (11) located on the front face of the Pump ring (8), which utilize several independent physical-mechanisms functioning jointly to restrict a potential lubrication oil leakage-flow as well as direct it back toward the Collector ring annulus (9) where the lubrication oil is then directed to exit the head through the Return port.

N. Specifically regarding the use of centrifugal hydrodynamic force in L. above, a pressure gradient, adverse to leakage, is created through use of a centrifugal pumping action. This effect is achieved by provision of pumping grooves (11), which are machined into the forward surface of the Pump ring (8), in a configuration which constitutes a spiral-grooved face-seal, capable of performing a centrifugal pumping-action. This pumping-action is configured to act in a direction which opposes the flow-direction of a potential leakage-stream exiting the rear Rotating-interface.

O. Specifically regarding the labyrinth-type sealing means of the lubrication oil stream, similar to the configuration present at the Forward rotating interface in G. above, a labyrinth-type sealing means, (14), provides retention of the lubrication oil stream at the Rear rotating interface. Specific physical phenomena present in the labyrinth-type sealing means common to both the Front and Rear rotating interfaces include:

a. Fluid turbulence resulting from abrupt changes of section in the flow path; This situation would exist at the entry-point, (Location 19), in which potential leakage-flow would enter the labyrinth-passage of the Rear Rotating-interface. An impedance to leakage-flow exists by virtue of the large difference in flow-areas existing at this location. The physical-mechanism responsible for creating this above-mentioned impedance to flow stems from inefficiencies generated when a fluid-flow is directed to change flow-direction abruptly. A typical result would be the formation of localized flow-separation bubbles, resulting in static-pressure loss. In relevant industry-literature, various methods are given with the intent of assigning a particular static-pressure "loss-coefficient" to such a flow-situation. This flow-phenomena is utilized to an advantage in reducing leakage-flow through the Rear Rotating-interface.

b. Turbulent conversion of static pressure to velocity; This particular situation would exist at the outer-perimeter of the Pump-ring (8), at location (20). The physical-mechanism responsible for creating this above-mentioned impedance to flow would be the formation of Taylor vortices in this close-tolerance gap between a rotating-part; Pumping ring (8) and a stationary-part; Trunnion (21). These so-called secondary-flows function to reduce the static-pressure in the primary-flow by a mechanism of frictional, energy-losses occurring between the series-type formation of Taylor-vortices and the part-surfaces in contact with the fluid-flow at location (20). The primary-flow in this situation is defined to be the net leakage-flow passing through location (20). A net-loss in static-pressure in the leakage-flow (i.e. primary-flow) passing through location (20) is directly-indicative of the flow-resistance present.

c. Wall friction effects; This particular situation exists in general throughout the labyrinth flow-passage(s) located at both the Front and Rear rotating-interfaces. The stream of lubrication oil is being retained within the collector ring annulus (9) prior to exiting the rear end of the mill head assembly by a series of close-tolerance labyrinth seal means (14) in communication with the collector ring annulus and located in the rear rotating interface, said series comprising a close-tolerance labyrinth seal means (14) disposed between the trunnion and the pump ring (8) and a close-tolerance labyrinth seal (14) means disposed between the collector ring (9) and the pump ring (8). The physical-mechanism responsible for creating this above-mentioned impedance to flow generally is more prominent with decreasing flow-passage cross-section height and increasing fluid-viscosity.

P. A Drain groove (13), having a drain end and a drain ring end, is located in the Collector ring. This feature serves to collect small amounts of leakage that can pass through the labyrinth-type sealing means (14). Fluid leakage collected & retained by the Drain groove (13), which constitutes a leakage-flow, is induced to re-combine with the main-stream of lubricating-oil through interaction of the leakage-stream with the Pump ring (8). Specifically, the leakage-flow is directed to impinge onto the rotating outer-circumference of the Pump-ring (8), at a specific location in the near-vicinity of the exit-passage leading to the Return-port (12). It is in this location that the static-pressure is at a minimum-value compared to the remainder of the perimeter of the Pump-ring, thus making this location a desirable-point in which to re-combine the leakage-flow, flowing from Drain-passage (15), with the main-stream of lubrication oil in Collector-ring annulus (9). Positioning of Drain-passage (15) at this point, in turn, serves to reduce the static-pressure of the leakage-flow in Drain-passage (15). This resultant reduction in static-pressure within Drain-passage (15), in turn, functions to establish a flow out of (15) where it is then combined with the main stream of lubricating oil stream, circulating within Collector-ring annulus (9), prior to exiting the head through Return-port (12). Thus, any lubrication oil leakage through the rear labyrinth passage between the trunnion (21) and the pump ring (8) is being retained and re-circulated back to the collector ring annulus (9) by the close-tolerance labyrinth seal means disposed between the trunnion (21) and the pump ring (8) and located on the forward surface.

I claim:

1. A seal-less head apparatus for retaining and re-circulating lubrication oil within a mill head assembly, comprising:
   (a) the mill head assembly having a front end of the mill head assembly and a rear end of the mill head assembly, and a set of stationary components comprising a trunnion, an oil ring, a bearing-retainer, and a collector ring, and a set of rotating components, comprising a housing, a pump ring, and a baffle-ring;
   (b) said front end having a forward rotating interface defining a forward labyrinth passage between the set of stationary components and the set of rotating components, and said rear end having a rear rotating interface defining a rear labyrinth passage between the set of stationary components and the set of rotating components;
   (c) the oil ring being cooperatively engaged against a front bearing means opposite the housing at the front rotating interface and against a rear bearing means at the rear rotating interface, both said bearing means being located opposite the housing;
   (d) the housing having a rotating means for rotating the set of rotating components when a power is supplied to the rotating means;
   (e) the rotating means creating a centrifugal hydrodynamic force to circulate the lubrication oil within the mill head assembly when the power is supplied to the rotating means;
   (f) the trunnion having a supply port with an open end engagingly cooperative with an external oil lubricating means for supplying the lubrication oil under pressure to the mill head assembly, and an opposite supply port end;
   (g) the supply port cooperatively connected by the supply port end to a supply passage disposed within the trunnion, the supply passage having an opposite oil ring end connected to the oil ring cooperatively engaged with the trunnion between the trunnion and the housing;

(h) the oil ring defining an inner annulus for receiving the lubrication oil via the supply passage and a ring front end and a ring back end;

(i) a plurality of spray holes being disposed within each of the ring front end and the ring back end;

(j) the lubrication oil circulating through the plurality of spray holes in each of the ring front end and ring back end to the respective front bearing means and the back bearing means, to the front end of the mill head assembly and rear end of the mill head assembly, respectively; cooling and lubricating both of said bearing means;

(k) the housing having a plurality of housing passages disposed through the housing from the front end of the mill head assembly to the rear end of the mill head assembly for re-circulating the lubrication oil from the front bearing means to the rear of the mill head assembly;

(l) lubrication oil exiting the front bearing means being retained between the housing and the trunnion prior to exiting the front end of the mill head assembly through the plurality of housing passages by a labyrinth-type sealing means for containing the lubrication oil exiting the front bearing means located in the forward rotating interface disposed between the bearing-retainer and the baffle-ring;

(m) the lubrication oil exiting the front bearing means re-circulating through the plurality of housing passages to the rear of the mill head assembly;

(n) lubrication oil circulating through the rear bearing means combining with the lubrication oil exiting the front bearing means and re-circulating through the plurality of housing passages, at the rear of the mill head assembly between the housing and the trunnion, creating a stream of lubrication oil;

(o) the pump ring attached to the outer surface of the housing, said pump ring being located cooperatively between the trunnion and the collector ring at the rear of the mill head assembly;

(p) the pump ring containing a forward surface, a rear surface, and an outer perimeter of the front surface;

(q) the pump ring containing a plurality of pump ring slots disposed within the pump ring, directing the stream of lubrication oil at the rear surface to a collector ring annulus defined within the collector ring located at the rear of the mill head assembly;

(r) the collector ring containing a return port cooperatively connected to the collector ring annulus having a collector ring end located at the collector ring annulus and an opposite free port end;

(s) the stream of lubrication oil being retained within the collector ring annulus prior to exiting the rear end of the mill head assembly by a series of close-tolerance labyrinth seal means in communication with the collector ring annulus and located in the rear rotating interface, said series comprising a close-tolerance labyrinth seal means disposed between the trunnion and the pump ring and a close-tolerance labyrinth seal means disposed between the collector ring and the pump ring;

(t) the stream of lubrication oil exiting the collector ring annulus at the collector ring end and the mill head assembly through the return port by the port end;

(u) any lubrication oil leakage through the rear labyrinth passage between the trunnion and the pump ring being retained and re-circulated back to the collector ring annulus by the close-tolerance labyrinth seal means disposed between the trunnion and the pump ring and located on said forward surface;

(v) any lubrication oil leakage through the rear labyrinth passage between the collector ring and the pump ring being retained and re-circulated back to the collector ring annulus by the close-tolerance labyrinth seal means disposed between the collector ring and the pump ring through a drain groove disposed within the collector ring in cooperation with the forward surface of the pump ring;

(w) the drain groove being cooperatively connected to a drain passage having a drain end connected to the drain groove and an opposite drain ring end cooperatively connected to the collector ring annulus;

(x) said lubrication oil leakages collectively exiting the collector ring annulus at the collector ring end the mill head assembly through the return port by the port end; and (z) whereby the lubrication oil is retained and re-circulated in the mill head assembly.

2. The apparatus of claim 1, wherein the oil lubricating means is an external lubricating-pump.

3. The apparatus of claim 1, wherein the bearing means is a plurality of ball bearings.

4. The apparatus of claim 1, wherein the bearing means is a plurality of tapered roller bearings.

5. The apparatus of claim 1, wherein the labyrinth-type sealing means is a multi-directional labyrinth passage at the forward rotating interface between the bearing-retainer and the baffle-ring.

6. The apparatus of claim 1, wherein the close-tolerance labyrinth sealing means comprising a plurality of pumping grooves having spiral grooved face-seals machined into the forward surface of the pump ring.

7. A method for retaining and re-circulating lubrication oil in a mill head assembly, the method comprising:
  (a) providing the mill head assembly having a front end of the mill head assembly and a rear end of the mill head assembly, and a set of stationary components comprising a trunnion, an oil ring, a bearing-retainer, and a collector ring, and a set of rotating components, comprising a housing, a pump ring, and a baffle-ring;
  (b) having a forward rotating interface within the front end of the mill head assembly defining a forward labyrinth passage between the set of stationary components and the set of rotating components located at the front end of the mill head assembly;
  (c) having a rear rotating interface within the rear end of the mill head assembly defining a rear labyrinth passage between the set of stationary components and the set of rotating components located at the rear end of the mill head assembly;
  (d) cooperatively engaging the oil ring against a front bearing means opposite the housing at the front rotating interface and against a rear bearing means at the rear rotating interface;
  (e) providing the housing with a rotating means for rotating the set of rotating components;
  (f) supplying a power to the rotating means;
  (g) creating a centrifugal hydrodynamic force through the rotating means to circulate the lubrication oil within the mill head assembly when the power is supplied to the rotating means;
  (h) providing a supply port to the trunnion with an open end engagingly cooperative with an external oil lubricating means for supplying the lubrication oil under pressure to the mill head assembly, and an opposite supply port end;

(i) cooperatively connecting the supply port by the supply port end to a supply passage disposed within the trunnion;

(j) providing the supply passage with an opposite oil ring end connected to the oil ring cooperatively engaged with the trunnion between the trunnion and the housing;

(k) defining an inner annulus by the oil ring for receiving the lubrication oil via the supply passage with a ring front end and a ring back end;

(l) disposing a plurality of spray holes within each of the ring front end and the ring back end;

(m) circulating the lubrication oil through the plurality of spray holes in each of the ring front end and ring back end to the respective front bearing means and to the back bearing means, to the front end of the mill head assembly and rear end of the mill head assembly, respectively;

(n) cooling and lubricating both of said bearing means;

(o) providing a plurality of housing passages disposed through the housing from the front end of the mill head assembly to the rear end of the mill head assembly for re-circulating the lubrication oil from the front bearing means to the rear of the mill head assembly;

(p) retaining the lubrication oil exiting the front bearing means between the housing and the trunnion prior to exiting the front end of the mill head assembly through the plurality of housing passages by a labyrinth-type sealing means located in the forward rotating interface disposed between the bearing-retainer and the baffle-ring;

(q) re-circulating the lubrication oil exiting the front bearing means through the plurality of housing passages to the rear of the mill head assembly;

(r) combining lubrication oil circulating through the rear bearing means with the lubrication oil exiting the front bearing means and re-circulating through the plurality of housing passages, at the rear of the mill head assembly between the housing and the trunnion;

(s) creating a stream of lubrication oil from combining the lubrication oil circulating through the rear bearing means and the lubrication oil exiting the front bearing means and re-circulating through the plurality of housing passages;

(t) attaching the pump ring to the outer surface of the housing, said pump ring being located cooperatively between the trunnion and the collector ring at the rear of the mill head assembly;

(u) containing within the pump ring a forward surface, a rear surface, and an outer perimeter of the front surface;

(v) containing within the pump ring a plurality of pump ring slots disposed within the pump ring;

(w) directing the stream of lubrication oil at the rear surface to a collector ring annulus defined within the collector ring located at the rear of the mill head assembly;

(x) providing the collector ring with a return port cooperatively connected to the collector ring annulus having a collector ring end located at the collector ring annulus and an opposite free port end;

(y) retaining the stream of lubrication oil within the collector ring annulus prior to exiting the rear end of the mill head assembly by a series of close-tolerance labyrinth seal means in communication with the collector ring annulus and located in the rear rotating interface, said series comprising a close-tolerance labyrinth seal means disposed between the trunnion and the pump ring and a close-tolerance labyrinth seal means disposed between the collector ring and the pump ring;

(z) discharging the stream of lubrication oil at the collector ring annulus by the collector ring end and the mill head assembly through the return port by the port end;

(aa) retaining and re-circulating back to the collector ring annulus any lubrication oil leakage through the rear labyrinth passage between the trunnion and the pump ring, by the close-tolerance labyrinth seal means disposed between the trunnion and the pump ring and located on said forward surface;

(bb) retaining and re-circulating back to the collector ring annulus any lubrication oil leakage through the rear labyrinth passage between the collector ring and the pump ring, by the close-tolerance labyrinth seal means disposed between the collector ring and the pump ring through a drain groove disposed within the collector ring in cooperation with the forward surface of the pump ring;

(cc) cooperatively connecting the drain groove to a drain passage having a drain end connected to the drain groove and an opposite drain ring end cooperatively connected to the collector ring annulus;

(dd) collectively discharging said lubrication oil leakages at the collector ring annulus by the collector ring and the mill head assembly through the return port by the port end; and (ee) thereby retaining and re-circulating the lubrication oil in the mill head assembly.

8. The method of claim 7, wherein the oil lubricating means is an external lubricating-pump.

9. The method of claim 7, wherein the bearing means is a plurality of ball bearings.

10. The method of claim 7, wherein the bearing means is a plurality of tapered roller bearings.

11. The method of claim 7, wherein the labyrinth-type sealing means is a multi-directional labyrinth passage at the forward rotating interface between the bearing-retainer and the baffle-ring.

12. The method of claim 7, wherein the close-tolerance labyrinth sealing means comprising a plurality of pumping grooves having spiral grooved face-seals machined into the forward surface of the pump ring.

* * * * *